United States Patent
Boyd

(10) Patent No.: US 6,626,324 B1
(45) Date of Patent: *Sep. 30, 2003

(54) PLASTIC CONTAINER HAVING A CRYSTALLINITY GRADIENT

(75) Inventor: Timothy J. Boyd, Ypsilanti, MI (US)

(73) Assignee: Schmalbach-Lubeca AG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/607,817

(22) Filed: Jun. 30, 2000

(51) Int. Cl.[7] .................................................. B65D 6/28
(52) U.S. Cl. ........................................ 220/609; 220/608
(58) Field of Search ................................. 220/608, 609; 215/376

(56) References Cited

U.S. PATENT DOCUMENTS

| | | |
|---|---|---|
| 4,039,641 A | 8/1977 | Collins |
| 4,091,059 A | 5/1978 | Ryder |
| 4,151,250 A | 4/1979 | Barry et al. |
| 4,154,920 A | 5/1979 | Jabarin |
| 4,244,913 A | 1/1981 | Ryder |
| 4,264,558 A | 4/1981 | Jacobsen |
| 4,385,089 A | 5/1983 | Bonnebat et al. |
| 4,476,170 A | 10/1984 | Jabarin |
| 4,512,948 A | 4/1985 | Jabarin |
| 4,522,779 A | 6/1985 | Jabarin |
| 4,755,404 A * | 7/1988 | Collette ................... 428/36.92 |
| 4,790,741 A | 12/1988 | Takakusaki et al. |
| 4,850,850 A | 7/1989 | Takakusaki et al. |
| 4,883,631 A | 11/1989 | Ajmera |
| 5,261,545 A | 11/1993 | Ota |
| 5,419,866 A * | 5/1995 | Valyi ............................ 264/521 |
| 5,520,877 A * | 5/1996 | Collette et al. ............. 264/521 |
| 5,735,420 A * | 4/1998 | Nakamaki et al. .......... 215/373 |
| 5,759,656 A * | 6/1998 | Collette et al. .......... 428/36.91 |
| 5,829,614 A * | 11/1998 | Collette et al. ............. 215/375 |
| 5,853,829 A * | 12/1998 | Krishnakumar et al. ... 428/35.7 |
| 5,906,286 A * | 5/1999 | Matsuno et al. ............. 215/375 |
| 5,908,128 A | 6/1999 | Krishnakumar et al. |

FOREIGN PATENT DOCUMENTS

WO    WO 96/30190    10/1996

OTHER PUBLICATIONS

The Crystallization of Oriented Poly(ethyleneterephthalate), F.S. Smith and R.D. Steward, CI Fibres, Hookstone Road, Harrogate, Yorkshire HG2 8QN, UK, Received May 15, 1973; revised Jun. 26, 1973.

The Crystallization of Poly(ethyleneterephthalate) and Related Copolymers, J.B. Jackson and F.W. Longman, Paper Presented at the SPE 27th Annual Technical Conference, Chicago, May 1969.

Crystallization and Thermal Stabilization of Heat Set PET, S.A. Jabarin, accepted for publication in the Polymeric Materials Encyclopedia.

* cited by examiner

Primary Examiner—Mickey Yu
Assistant Examiner—Troy Arnold
(74) Attorney, Agent, or Firm—Harness, Dickey & Pierce, P.L.C.

(57) ABSTRACT

A plastic container including a portion of a sidewall having an interior surface with an interior crystallinity, and an exterior surface with an exterior crystallinity. The interior crystallinity is greater than the exterior crystallinity. The higher crystallinity on the interior surface provides increased resistance to flavor scalping along the surface contacting the commodity, thereby minimizing flavor scalping of the commodities inside the plastic container.

6 Claims, 2 Drawing Sheets

PLASTIC CONTAINER HAVING A CRYSTALLINITY GRADIENT

TECHNICAL FIELD OF THE INVENTION

This invention generally relates to plastic containers for retaining a commodity during a pasteurization or retort process and during subsequent shipment and use. More specifically, this invention relates to plastic containers that minimize flavor scalping of commodities inside the plastic containers.

BACKGROUND

Recently, manufacturers of polyethylene terephthalate (PET) containers have begun to supply plastic containers for commodities that were previously packaged in glass containers. The manufacturers, as well as consumers, have recognized that PET containers are lightweight, inexpensive, recyclable, and manufacturable in large quantities. Manufacturers currently supply PET containers for various liquid commodities, such as juices. They also desire to supply PET containers for solid commodities, such as pickles. Many solid commodities, however, require pasteurization or retort, which presents an enormous challenge for manufactures of PET containers.

Pasteurization and retort are both methods for sterilizing the contents of a container after it has been filled. Both processes include the heating of the contents of the container to a specified temperature, usually above 70° C., for duration of a specified length. Retort differs from pasteurization in that it also applies overpressure to the container. The pressure is necessary because a hot water bath is often used and the overpressure keeps the water in liquid form above its boiling point temperature. These processes present technical challenges for manufactures of PET containers, since new pasteurizable and retortable PET containers for these food products will have to perform above and beyond the current capabilities of conventional heat set containers. Quite simply, the PET containers of the current techniques in the art cannot be produced in an economical manner such that they maintain their material integrity during the thermal processing of pasteurization and retort and during subsequent shipping.

PET is a crystallizable polymer, meaning that it is available in an amorphous form or a semi-crystalline form. The ability of a PET container to maintain its material integrity is related to the percentage of the PET container in crystalline form, also known as the "crystallinity" of the PET container. Crystallinity is characterized as a volume fraction by the equation:

$$\% \text{ Crystallinity} = \frac{\rho - \rho_a}{\rho_c - \rho_a} \times 100$$

where $\rho$ is the density of the PET material; $\rho_a$ is the density of pure amorphous PET material (1.333 g/cc); and $\rho_c$ is the density of pure crystalline material (1.455 g/cc). The crystallinity of a PET container can be increased by mechanical processing and by thermal processing.

Mechanical processing involves orienting the amorphous material to achieve strain hardening. This processing commonly involves streching a PET container along a longitudinal axis and expanding the PET container along a transverse axis. The combination promotes biaxial orientation. Manufacturers of PET bottles currently use mechanical processing to produce PET bottles having roughly 20% crystallinity (average sidewall crystallinity).

Thermal processing involves heating the material (either amorphous or semi-crystalline) to promote crystal growth. Used by itself on amorphous material, thermal processing of PET material results in a spherulitic morphology that interferes with the transmission of light. In other words, the resulting crystalline material is opaque (and generally undesirable in the sidewall of the container). Used after mechanical processing, however, thermal processing results in higher crystallinity and excellent clarity. The thermal processing of an oriented PET container, which is known as heat setting, typically includes blow molding a PET preform against a heated blow mold, at a temperature of 120–130° C., and holding the blown container for about 3 seconds. Manufacturers of PET juice bottles, which must be hot filled at about 85° C., currently use heat setting to produce PET juice bottles having a range of up to 25–30% crystallinity.

Although heat set PET bottles perform adequately during hot fill processes, they are inadequate to withstand a pasteurization or retort process. PET containers also suffer from flavor scalping. Although not fully understood, flavor scalping includes a transfer of the flavor of a commodity to the walls of a plastic container. This phenomenon, though not harmful, dulls the flavor of the commodity, thereby reducing the overall satisfaction of the customer.

Thus, the manufacturers of PET containers desire to produce a PET container that maintains material integrity during any subsequent pasteurization or retort of the contents in the PET container, and during subsequent shipment of the PET container. Further, the manufacturers of PET containers desire to produce a PET container that minimizes flavor scalping of the commodities inside the PET containers. It is therefore an object of this invention to provide such a container that overcomes the problems and disadvantages of the conventional techniques in the art.

SUMMARY OF THE INVENTION

Accordingly, this invention provides for a plastic container which maintains material integrity during any subsequent pasteurization or retort process, and during subsequent shipment and use. Additionally, this invention provides for a plastic container which minimizes flavor scalping of the commodities inside the plastic container.

Briefly, the plastic container of the invention includes a portion of a sidewall having an interior surface with an interior crystallinity, and an exterior surface with an exterior crystallinity. The interior crystallinity is greater than the exterior crystallinity. The higher crystallinity on the interior surface provides increased resistance to flavor scalping along the surface contacting the commodity, thereby minimizing flavor scalping of the commodities inside the plastic container.

Another object is to provide a container with high crystallinity, namely a sidewall crystallinity of greater than 30%.

By using the fluid cycle process, the plastic container 10 can be produced having a sidewall 16 with a sidewall density greater than 1.375 g/cc. This density roughly corresponds to a 34.4% crystallinity and will allow the plastic container 10 to maintain its material integrity during a pasteurization or retort process of the commodity in the plastic container 10, and during subsequent shipment of the plastic container 10. As used herein, crystallinities greater than 30% are considered "high crystallinities". Other densities greater than 1.375 g/cc, including 1.38 g/cc (roughly corresponding to 38.5% crystallinity), 1.385 g/cc (roughly corresponding to 42.6% crystallinity), and even 1.39 g/cc (roughly corresponding to 46.7% crystallinity) are possible with the fluid cycle process, without significantly impacting the visually perceptible transparency or clarity of the plastic container 10.

DETAILED DESCRIPTION OF THE PREFERRED EMBODIMENT

The following description of the preferred embodiment is merely exemplary in nature, and is in no way intended to limit the invention or its application or uses.

Figure 1:
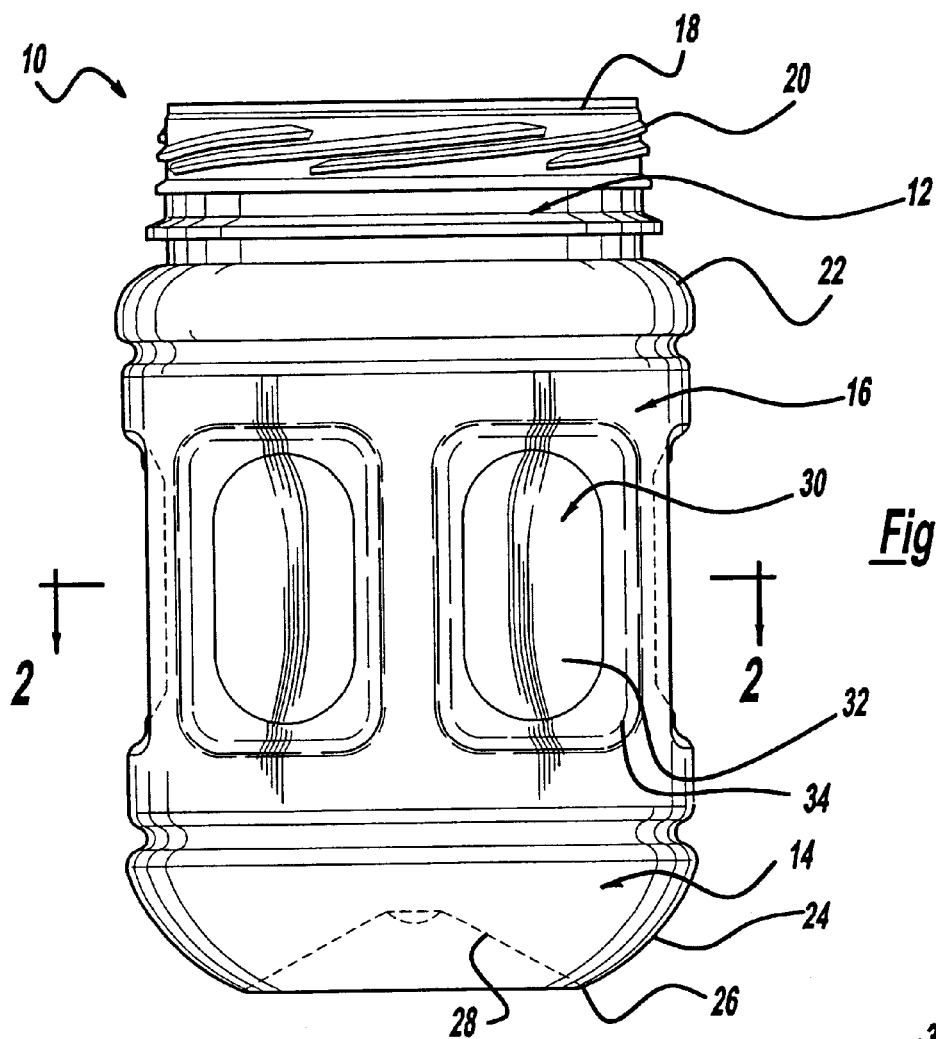
FIG. 1 is an elevation view of the plastic container according to the present invention.

As shown in FIG. 1, the plastic container 10 of the invention includes an upper portion 12, a lower portion 14, and a sidewall 16. The upper portion 12 of the plastic container 10 defines an aperture 18, and includes a threaded region 20 and a shoulder region 22. The aperture 18 allows the plastic container 10 to receive a commodity. The threaded region 20 provides an attachment for a similarly threaded cap (not shown), which preferably provides a hermetical seal for the plastic container 10. The shoulder region 22 provides a structural transition between the threaded region 20 and the sidewall 16.

The lower portion 14 of the plastic container 10, which generally extends inward from the sidewall 16, includes a base 24, which functions to close off the bottom of the container. The base 24 includes a support 26 or contact ring and an inwardly recessed region 28. The base 24 functions to close off the lower portion 14 and, together with the upper portion 12 and the sidewall 16, to retain the commodity.

In the preferred embodiment of the invention, the sidewall 16, which generally extends downward from the upper portion 12, includes several panels 30 that are equally spaced around the sidewall 16. Each of the panels 30 includes a pressure-panel portion 32 and a vacuum panel portion 34. The pressure-panel portion 32 and the vacuum panel portion 34 function to control and limit the deformation of the sidewall 16 during a pasteurization or retort process of the commodity within the plastic container 10, and during cooling of the commodity. More specific information regarding the pressure-panel portion 32 and the vacuum panel portion 34 of the panels 30 can be found in U.S. Pat. No. 6,460,714, issued on Oct. 8, 2002, assigned to the same Assignee as the present invention and hereby incorporated in its entirety by this reference.

The plastic container 10 is preferably blow molded, biaxially oriented, and heat set with a unitary construction from a single layer of plastic material such as polyethylene terephthalate (PET) resin. Alternatively, the plastic container 10 may be formed by other methods and from other conventional materials, with or without coatings and with or without barriers. Plastic containers blow-molded with a unitary construction from a PET material are known and used in the a art of plastic containers and their manufacture in the present invention would be readily understood by a person of ordinary skill in the art.

Figure 2:
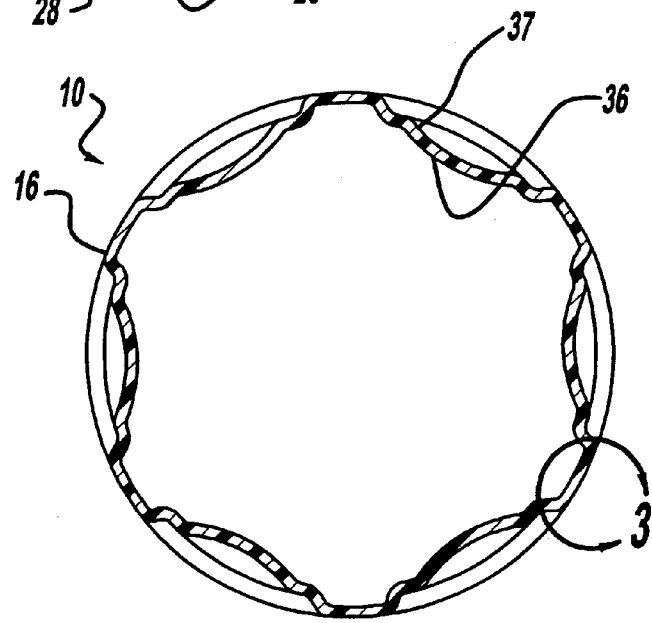
FIG. 2 is a cross-sectional view of the plastic container, taken generally along the line 2—2 of FIG. 1.

The plastic container 10 is preferably heat set with a fluid cycle process. The fluid cycle process includes circulating a high-temperature fluid over an interior surface 36 of the sidewall 16, as shown in FIG. 2. The high-temperature fluid is circulated over the interior surface 36 for a sufficient duration to allow the interior surface 36 to reach a temperature of at least 150° C. The actual duration depends on the composition, temperature, and pressure of the high-temperature fluid, and the flow rate of the high-temperature fluid over the interior surface 36. In the preferred method, the high-temperature fluid is at a temperature of at least 200° C., and at a pressure of at least 1000 kPa. Although the preferred composition of the high-temperature fluid is air, other fluids such as steam may be used, as well as higher temperatures and pressures. At the preferred values, the high-temperature fluid is circulated over the interior surface 36 for 1 to 15 seconds, in order to transfer the necessary heat energy to induce the appropriate amount of crystallinity into the plastic container 10. More specific information regarding this fluid cycle process can be found in U.S. Pat. No. 6,485,669, issued on Nov. 26, 2002, assigned to the same Assignee as the present invention and hereby incorporated in its entirety by this reference.

By using the fluid cycle process, the plastic container 10 can be produced having a sidewall 16 with an sidewall density greater than 1.375 g/cc. This density roughly corresponds to a 34.4% crystallinity and will allow the plastic container 10 to maintain its material integrity during a pasteurization or retort process of the commodity in the plastic container 10, and during subsequent shipment of the plastic container 10. As used herein, crystallinities greater than 30% are considered "high crystallinities". Other densities greater than 1.375 g/cc, including 1.38 g/cc (roughly corresponding to 38.5% crystallinity), 1.385 g/cc (roughly corresponding to 42.6% crystallinity), and even 1.39 g/cc (roughly corresponding to 46.7% crystallinity) are possible with the fluid cycle process, without significantly impacting the visually perceptible transparency or clarity of the plastic container 10.

The crystallinity throughout the sidewall 16 from an interior surface 36 to an exterior surface 37 is not constant. Rather, an interior crystallinity measured on the interior surface 36 is greater than an exterior crystallinity as measured on the exterior surface 37. Since flavor scalping is reduced when the crystallinity of the material contacting the commodity is increased, the plastic container 10 of the present invention minimizes flavor scalping by placing the surface layer of the sidewall 16 with the greatest crystallinity where it is needed most, next to the commodity and on the interior surface 36 of the plastic container 10.

The difference between the interior crystallinity and the exterior crystallinity is preferably at least 0.005 g/cc (roughly corresponding at least to 4% crystallinity), and is more preferably at least 0.01 g/cc (roughly corresponding to at least 8% crystallinity). Since the flavor scalping of the commodity is reduced as the crystallinity is increased, the interior crystallinity should be at least 34% (roughly corresponding to 1.375 g/cc), and is more preferably at least 42% (roughly corresponding to 1.385 g/cc). Accordingly, the exterior crystallinity should be preferably equal to or less than 34% (roughly corresponding to 1.375 g/cc).

Figure 3:
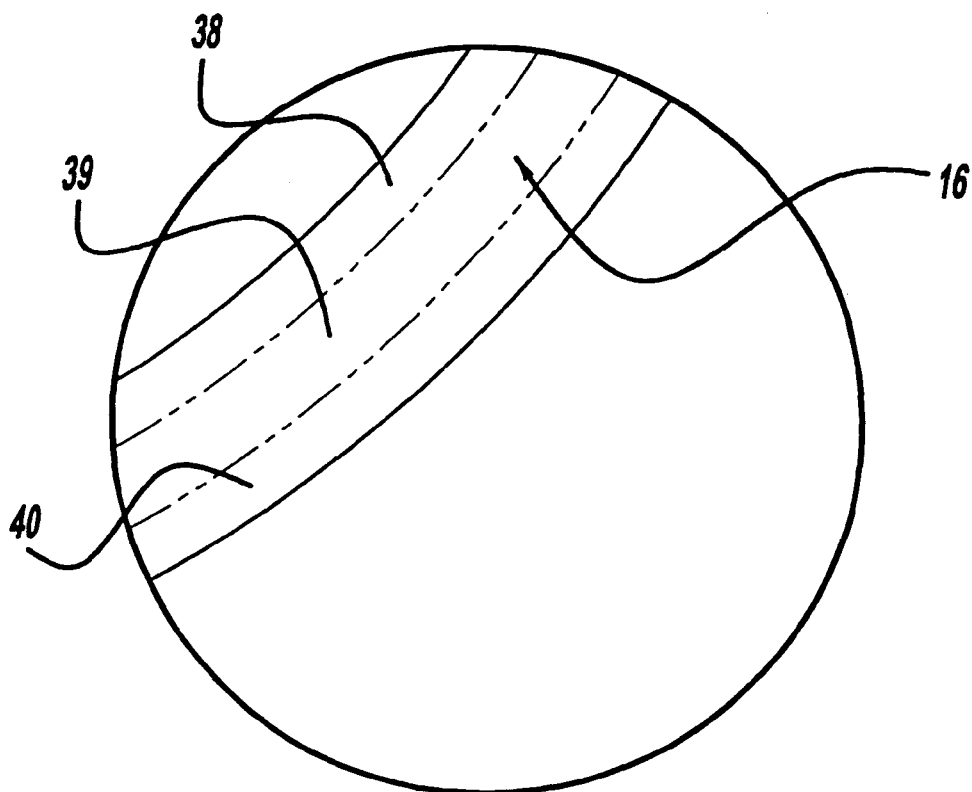
FIG. 3 is an enlarged view of the sidewall of the plastic container, taken from the section 3 of FIG. 2.

The interior crystallinity of the interior surface 36 and the exterior crystallinity of the exterior surface 37 may, however, be difficult to measure because crystallinity must be measured at a specific depth (at least one molecule). To avoid this difficulty, the sidewall 16 of the plastic container 10 may be thought of as having an inner layer 38 with an inner density, a middle layer 39 (later referred to as "a thickness"), and an outer layer 40 with an outer density, as shown in FIG. 3. The inner layer 38 and the outer layer 40 may be as narrow as the width of one molecule or may be as wide as 50% of the width of the sidewall 16. The middle layer 39, consisting of the area between the inner layer 38 and the outer layer 40, may thus be relatively wide or not exist at all. The middle layer 39 is preferably made from a PET material, but may alternatively be made from other suitable materials, such as a nylon material. Further, the plastic container 10 may be coated with a coating layer (not shown), such as an epoxy material. In these circumstances, the inner layer 38 and the outer layer 40 should be thought of as the inner "structural" layer 38 of plastic material and the outer "structural" layer 40 of plastic material, and not of the coating layer. Within this framework, the inner density of the inner layer 38 is greater than the outer density of the outer layer 40.

Figure 4:
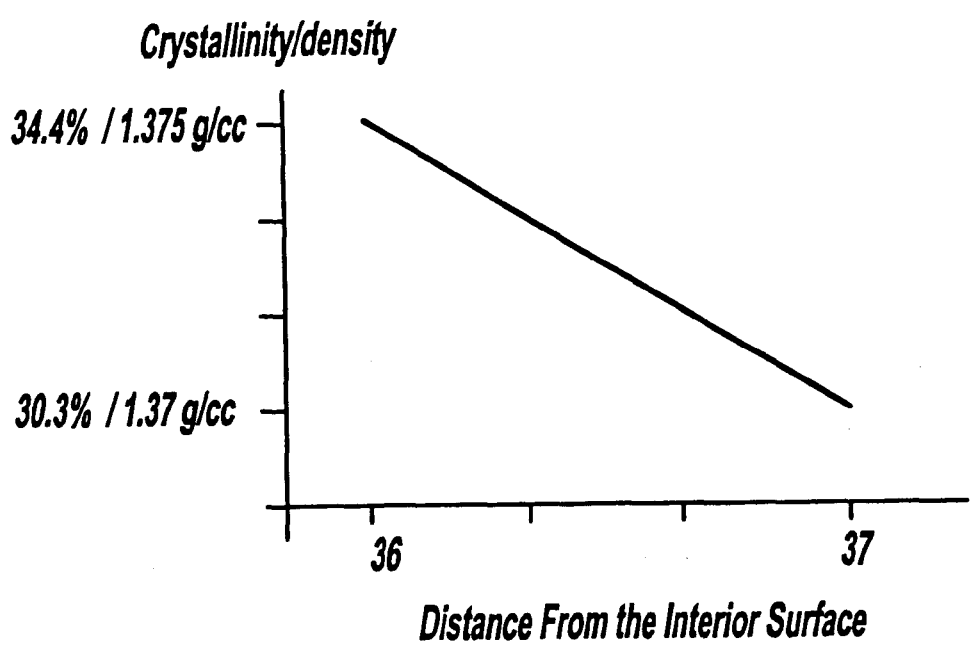
FIG. 4 is a graph of the crystallinity/density vs. distance from the interior surface of the sidewall of the plastic container according to the present invention.

As shown in FIG. 4 and referred to above, the crystallinity of the sidewall 16 may also be viewed as a gradient, decreasing as the distance from the interior surface 36 is increased. In an alternative embodiment of the present invention, the gradient may not be linear, and may not always have a negative slope. As clearly shown from this chart, however, the interior crystallinity is greater than the exterior crystallinity.

For clarification, the inner density and the outer density may be taken at any portion of the sidewall 16. For example, the exact location of the portion could vary along three directions: a circumferential direction around the plastic container 10, an axial direction up and down the sidewall 16 of the plastic container 10, and a radial direction out through the layers or sections of the sidewall 16. Similarly, the interior crystallinity and the exterior crystallinity may be taken at any portion of the sidewall 16. In contrast to the other terms, the interior crystallinity and exterior crystallinity will only vary in two directions: the circumferential direction and the axial direction because, at least in theory, each measurement used to calculate the interior crystallinity will be taken at the same radial depth and each measurement used to calculate the exterior crystallinity will be taken at the same radial depth.

The foregoing discussion discloses and describes a preferred embodiment of the present invention. One skilled in the art will readily recognize from such discussion, and from the accompanying drawings and claims, that changes and modifications can be made to the invention, including varying the timing sequence, without departing from the true spirit and fair scope of the invention as defined in the following claims.

I claim:

1. A polyethylene terephthalate container for retaining a commodity, said container comprising an upper portion defining an aperture for receiving the commodity, a sidewall generally extending downward from said upper portion, and a lower portion generally extending inward from said sidewall and closing off a bottom of said container, a portion of said sidewall having an inner layer and an outer layer, said inner layer having an inner density and said outer layer having an outer density, wherein said inner density is at least 0.005 g/cc greater than said outer density, said outer density measuring from about 1.370 g/cc to about 1.375 g/cc.

2. A polyethylene terephthalate container for retaining a commodity, said container comprising a neck defining an open upper end for receiving a closure, a shoulder generally extending downward and outward from said neck, a sidewall generally extending downward from said shoulder, and a base generally extending inward from said sidewall and defining a closed bottom end of said container, a portion of said sidewall having an interior surface with an interior crystallinity, an exterior surface with an exterior crystallinity, and a thickness between said interior surface and said exterior surface, said interior crystallinity being at least 4% greater than said exterior crystallinity, said exterior crystallinity measuring from about 30% to about 34%.

3. A polyethylene terephthalate container according to claim 1, wherein said polyethylene terephthalate within said sidewall is biaxially oriented.

4. A polyethylene terephthalate container according to claim 1, wherein said inner density is at least 0.010 g/cc greater than said outer density.

5. A polyethylene terephthalate container according to claim 2, wherein said polyethylene terephthalate within said sidewall is biaxially oriented.

6. A polyethylene terephthalate container according to claim 2, wherein said interior crystallinity is at least 8% greater than said exterior crystallinity.

\* \* \* \* \*

UNITED STATES PATENT AND TRADEMARK OFFICE
CERTIFICATE OF CORRECTION

PATENT NO.     : 6,626,324 B1
DATED          : September 30, 2003
INVENTOR(S)    : Timothy J. Boyd It is certified that error appears in the above-identified patent and that said Letters Patent is hereby corrected as shown below:

<u>Column 2, line 58, through to Column 3, line 5,</u>
Delete paragraph "By using the fluid cycle process, the plastic container 10 can be poduced having a sidewall 16 with a sidewall density greater than 1.375 g/cc. This density roughly corresponds to a 34.4% crystallinity and will allow the plastic container 10 to maintain its material integrity during a pasteurization or retort process of the commodity in the plastic container 10, and during subsequent shipment of the plastic container 10. As used herein, crystallinities greater than 30% are considered "high crystallinities". Other densities greater than 1.375 g/cc, including 1.38 g/cc (roughly corresponding to 38.5% crystallinity), 1.385 g/cc (rougly corresponding to 42.6% crystallinity), and even 1.39 g/cc (roughly corresponding to 46.7% crystallinity are possible with the fluid cycle process, without significantly impacting the visually perceptible transparency or clarity of the plastic container 10."

<u>Column 3,</u>
Line 6, insert paragraph -- Further features and advantages of the invention will become apparent from the following discussion and accompanying drawings --.
Line 65, after "in the" delete "a".

Signed and Sealed this

First Day of June, 2004

JON W. DUDAS
*Acting Director of the United States Patent and Trademark Office*